(12) United States Patent
Joshi

(10) Patent No.: US 12,475,460 B2
(45) Date of Patent: Nov. 18, 2025

(54) MANAGING CRYPTOGRAPHIC KEY LIFECYCLES VIA MULTI-LAYER METADATA AND DYNAMIC KEY EXCHANGES

(71) Applicant: Marqeta, Inc., Oakland, CA (US)

(72) Inventor: Sandeep Joshi, Samamish, WA (US)

(73) Assignee: Marqeta, Inc., Oakland, CA (US)

( * ) Notice: Subject to any disclaimer, the term of this patent is extended or adjusted under 35 U.S.C. 154(b) by 180 days.

(21) Appl. No.: 18/151,896

(22) Filed: Jan. 9, 2023

(65) Prior Publication Data
US 2024/0232880 A1  Jul. 11, 2024

(51) Int. Cl.
*G06Q 20/40* (2012.01)
*G06Q 20/34* (2012.01)
*G06Q 20/38* (2012.01)

(52) U.S. Cl.
CPC .......... *G06Q 20/401* (2013.01); *G06Q 20/34* (2013.01); *G06Q 20/3829* (2013.01)

(58) Field of Classification Search
CPC .. G06Q 20/401; G06Q 20/34; G06Q 20/3829; G06Q 20/02; G06Q 20/0855; G06Q 2220/00; H04L 2209/56; H04L 9/0891; H04L 9/0897; G06F 21/602
See application file for complete search history.

(56) References Cited

U.S. PATENT DOCUMENTS

| | | | | |
|---|---|---|---|---|
| 10,074,030 | B2* | 9/2018 | Van Eeuwijk | H04B 10/116 |
| 10,356,094 | B2* | 7/2019 | Anton | G06F 21/6227 |
| 10,540,522 | B2* | 1/2020 | Edgar | G06F 21/602 |
| 10,909,250 | B2* | 2/2021 | Rudzitis | H04L 9/083 |
| 11,418,331 | B1* | 8/2022 | Villapakkam | H04L 9/14 |
| 11,444,754 | B1* | 9/2022 | Shaked | H04L 9/0894 |
| 11,727,392 | B2* | 8/2023 | Shrivastava | G06Q 20/3674 705/41 |

(Continued)

OTHER PUBLICATIONS

Barker et al., "A Framework for Designing Cryptographic Key Management Systems", Aug. 2013, NIST, pp. 31-66 (Year: 2013).*

*Primary Examiner* — John W Hayes
*Assistant Examiner* — Yingying Zhou
(74) *Attorney, Agent, or Firm* — Keller Preece PLLC

(57) ABSTRACT

This disclosure describes methods, non-transitory computer readable storage media, and systems that manage cryptographic key lifecycles and dynamic key exchanges in connection with payment card accounts. Specifically, the disclosed system receives a key request from a payment card network to store a cryptographic key in a hardware security device associated with a third-party system for use in connection with processing transactions involving a payment card account. Additionally, in response to the key request, the disclosed system generates a metadata layer including metadata associated with the cryptographic key within a distributed database. The disclosed system utilizes the metadata layer stored in the distributed database to validate the cryptographic key in response to a transaction request including the cryptographic key. In connection with the hardware security device associated with the third-party system, the disclosed system performs a transaction corresponding to the transaction request in response to validating the cryptographic key.

20 Claims, 8 Drawing Sheets

(56) References Cited

U.S. PATENT DOCUMENTS

| | | | |
|---|---|---|---|
| 11,755,693 B1* | 9/2023 | Crawforth | H04L 9/14 |
| | | | 713/164 |
| 11,762,846 B1* | 9/2023 | Atherton | G06F 16/27 |
| | | | 713/193 |
| 12,218,795 B2* | 2/2025 | Smith | H04L 9/3239 |
| 2003/0208684 A1* | 11/2003 | Camacho | G06Q 20/401 |
| | | | 713/185 |
| 2007/0086593 A1* | 4/2007 | Denning | H04L 63/0428 |
| | | | 380/286 |
| 2009/0022318 A1* | 1/2009 | Kasahara | H04L 9/0822 |
| | | | 380/277 |
| 2009/0092252 A1* | 4/2009 | Noll | H04L 9/083 |
| | | | 380/277 |
| 2009/0208003 A1* | 8/2009 | Matsukawa | H04L 9/0891 |
| | | | 380/44 |
| 2012/0023329 A1* | 1/2012 | Yamamoto | H04L 9/3268 |
| | | | 713/158 |
| 2017/0323114 A1* | 11/2017 | Egorov | H04L 63/0435 |
| 2017/0338949 A1* | 11/2017 | Amiri | H04L 9/0822 |
| 2018/0254901 A1* | 9/2018 | Egorov | H04L 9/0822 |
| 2018/0330079 A1* | 11/2018 | Gray | H04L 9/0894 |
| 2021/0035195 A1* | 2/2021 | Martin | G06Q 20/12 |
| 2021/0184848 A1* | 6/2021 | Roowalla | H04L 63/123 |
| 2021/0320802 A1* | 10/2021 | Visegrady | H04L 9/083 |
| 2022/0045848 A1* | 2/2022 | Hulshof | H04L 9/3236 |
| 2022/0108018 A1* | 4/2022 | Osorio Lozano | H04L 9/0897 |
| 2022/0263655 A1* | 8/2022 | Murray | H04L 63/0823 |
| 2022/0329413 A1* | 10/2022 | Schindewolf | G06F 21/602 |
| 2022/0366381 A1* | 11/2022 | Gazon | H04L 9/3247 |
| 2023/0027329 A1* | 1/2023 | Durham | G06F 21/602 |
| 2024/0104229 A1* | 3/2024 | Venkatesan | G06F 21/6218 |

* cited by examiner

MANAGING CRYPTOGRAPHIC KEY LIFECYCLES VIA MULTI-LAYER METADATA AND DYNAMIC KEY EXCHANGES

BACKGROUND

Improvements in computing technology have led to an increase in the use of card-based payment transactions and electronic payment transactions. The prevalence of card-based/electronic payment transactions has also led to many entities providing increased access to payment cards (e.g., credit cards or debit cards) for consumers to use with merchants and other recipients. In connection with processing transactions associated with payment card accounts, payment card networks initialize transactions involving the payment card accounts via the use of cryptographic keys to ensure the security of the transactions. Although utilizing cryptographic keys provides improved security of transaction processing involving payment card accounts, conventional systems capable of handling cryptographic keys have several disadvantages related to accurately and efficiently processing the transactions. For example, conventional systems lack the ability to process transactions during key exchange periods when the payment card networks publish new cryptographic keys.

SUMMARY

This disclosure describes one or more embodiments of methods, non-transitory computer readable media, and systems that solves one or more of the foregoing problems (in addition to providing other benefits). In one or more embodiments, the disclosed systems receive a key request from a payment card network to store a cryptographic key in a hardware security device associated with a third-party system for use in connection with processing transactions involving a payment card account. Additionally, in response to the key request, the disclosed systems generate a metadata layer including metadata associated with the cryptographic key within a distributed database. The disclosed systems utilize the metadata layer stored in the distributed database to validate the cryptographic key in response to a transaction request including the cryptographic key. Furthermore, in connection with the hardware security device associated with the third-party system, the disclosed systems perform a transaction corresponding to the transaction request in response to validating the cryptographic key. By generating and leveraging metadata layers in a distributed database for validating and monitoring cryptographic keys, the disclosed systems provide accurate, efficient, and secure handling of a plurality of different versions of a cryptographic key during key exchange periods.

BRIEF DESCRIPTION OF THE DRAWINGS

The detailed description refers to the drawings briefly described below.

DETAILED DESCRIPTION

Figure 1:
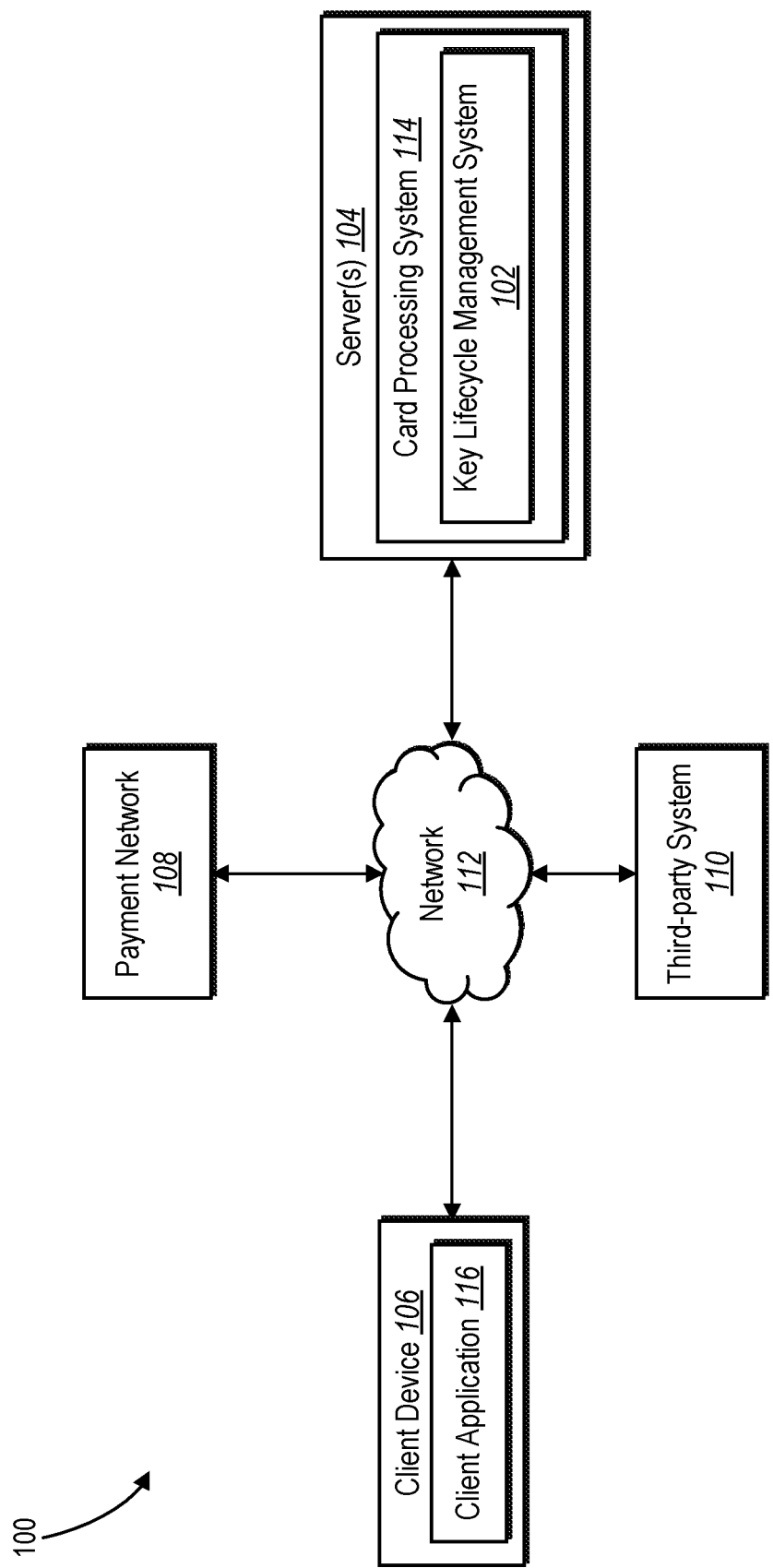
FIG. 1 illustrates a block diagram of a system environment in which a key lifecycle management system is implemented in accordance with one or more implementations.

This disclosure describes one or more embodiments of a key lifecycle management system that utilizes separate metadata layers to validate and dynamically exchange cryptographic keys for payment card accounts for programmatic key lifecycle management. In particular, the key lifecycle management system manages key exchange operations, key validation operations, and event monitoring operations for a plurality of cryptographic keys. For example, in response to a key request to store a symmetric cryptographic key for a payment card account, the key lifecycle management system generates a metadata layer including metadata associated with the cryptographic key. Additionally, the key lifecycle management system utilizes the metadata layer to validate the cryptographic key in a transaction request and performs a corresponding transaction. In additional embodiments, the key lifecycle management system monitors events associated with the cryptographic key to force a key exchange and generate additional metadata associated with a new cryptographic key.

As mentioned, in one or more embodiments, the key lifecycle management system receives a key request to store a cryptographic key for a payment card account. Specifically, the key lifecycle management system, as part of a card processing system, receives the key request from a payment card network associated with the payment card account (e.g., in response to a key exchange at the payment card network). For example, the key request includes the cryptographic key for storing the cryptographic key in a hardware security device associated with a third-party system to use in processing/validating future transactions involving the payment card account.

In one or more embodiments, the key lifecycle management system generates metadata associated with a cryptographic key. For example, the key lifecycle management system generates a metadata layer including metadata that indicates specific details associated with the cryptographic key. To illustrate, the key lifecycle management system generates the metadata layer corresponding to the cryptographic key for storing within a distributed database of the card processing system. Accordingly, the key lifecycle management system generates a plurality of separate metadata layers corresponding to a plurality of different key versions for the payment card account.

According to one or more embodiments, the key lifecycle management system validates a cryptographic key received in response to a transaction request utilizing corresponding metadata. In particular, the key lifecycle management system accesses a metadata layer corresponding to the cryptographic key within the distributed database. For instance, the key lifecycle management system determines whether the cryptographic key in the transaction request is valid utilizing the metadata layer according to a set of rules. To illustrate, the key lifecycle management system determines whether a version number, geographic tag, and/or timestamp(s) associated with the cryptographic key match the metadata in the corresponding metadata layer to validate the cryptographic key.

In one or more embodiments, in response to validating a cryptographic key, the key lifecycle management system performs a transaction corresponding to the transaction request. Specifically, the key lifecycle management system performs the transaction in connection with the hardware security device that includes the symmetric cryptographic key. For example, the key lifecycle management system performs a transaction including, but not limited to, processing a payment transaction, accessing a personal identification number, or modifying one or more details associated with a payment card account corresponding to the cryptographic key.

In some embodiments, the key lifecycle management system monitors events associated with a cryptographic key to determine whether to force a key exchange. For example, the key lifecycle management system detects a key validation event or an anomaly event associated with the cryptographic key. Additionally, in response to one or more detected events, the key lifecycle management system forces a key exchange to swap the cryptographic key stored in a hardware security device of a third-party system with a new cryptographic key (e.g., a new version of the key). Accordingly, the key lifecycle management system generates a new metadata layer including new metadata in response to receiving the new cryptographic key from the payment card network.

As mentioned, conventional systems lack flexibility and efficiency in processing transactions while exchanging cryptographic keys associated with payment card accounts. Specifically, payment card networks can take a certain amount of time to exchange a cryptographic key with a new version (e.g., up to several hours) and activate the new version. Furthermore, transaction processing systems typically utilize universal standards such as ISO 8583 to securely transmit data associated with payment card accounts, which require cryptographic keys to decrypt. The conventional systems often reject transactions because the conventional systems lack the ability to process transactions during the key exchange periods, which thus results in requiring transmission of new transaction requests/data after the key exchange period. Accordingly, the conventional systems are unable to process transactions involving payment card accounts in a number of circumstances.

The disclosed key lifecycle management system provides a number of benefits over conventional systems. For example, the key lifecycle management system improves the flexibility and efficiency of computing systems that manage and process transactions involving payment card accounts. In contrast to existing systems that cannot process transactions during key exchange periods, the key lifecycle management system provides multi-key support/management with enforced dynamic key exchange. Specifically, the key lifecycle management system utilizes a distributed database to generate and manage a plurality of metadata layers for different cryptographic key versions. The key lifecycle management system further utilizes metadata layers in the distributed database to validate different versions of cryptographic keys during key exchange periods for processing transactions during key exchange periods.

Furthermore, improves the security of computing systems that process transactions associated with payment card accounts. In contrast to existing systems that exchange cryptographic keys according to predetermined time periods, the key lifecycle management system leverages multi-layer metadata to provide forced dynamic key exchange based on detected events. For instance, the key lifecycle management system renegotiates dynamic key exchanges in response to detecting specific key validation events or anomaly events. By forcing key exchanges in response to specific events, the key lifecycle management system provides fast and secure management of cryptographic key versions for a payment card account while also providing the ability to process transactions involving the payment card account during the key exchanges. In particular, the key lifecycle management system provides fast/real-time key rotation with geofencing to prevent external malicious attacks on increasingly complex networks/systems.

Turning now to the figures, FIG. 1 includes an embodiment of a system environment 100 in which a key lifecycle management system 102 operates. In particular, the system environment 100 includes server(s) 104, a client device 106, a payment network 108, and a third-party system 110 in communication via a network 112. FIG. 1 illustrates that the key lifecycle management system 102 is part of a card processing system 114. Moreover, in one or more embodiments, the client device 106 includes a client application 116.

As shown in FIG. 1, the server(s) 104 include or host the card processing system 114. The server(s) 104 communicate with one or more other components in the system environment 100 to facilitate processing of card-based payment transactions and electronic payment transactions involving payment card accounts. Specifically, the card processing system 114 includes a processing application that authorizes/declines card-based payment transactions involving a payment card account, such as by communicating with the third-party system 110. As used herein, the term "payment card account" refers to a card-based payment account associated with a physical card or a digital card. To illustrate, a payment card account includes a debit account or a credit account for processing payment transactions via the use of a physical card or a digital card (e.g., in a digital wallet).

In one or more embodiments, the card processing system 114 communicates with payment network 108 to initiate/process card-based payment transactions (e.g., in response to the client device 106 providing a transaction request to the card processing system 114). In one or more embodiments, the payment network 108 includes one or more payment gateway systems, one or more payment card networks (e.g., VISA, MASTERCARD), and/or one or more card issuer systems (e.g., bank issuers) to process electronic card transactions in connection with the card processing system 114. The payment network 108 includes one or more servers to generate, store, and transmit data associated with initiating and processing electronic card transactions via the card processing system 114. In some embodiments, the card processing system 114 communicates with one or more additional participant systems including, but not limited to, the third-party system 110 to initiate/process transactions involving the payment card accounts. In one or more embodiments, the third-party system 110 manages funds or ledgers associated with the payment card accounts.

As used herein, the term "transaction" refers to a computer-based processing operation involving a payment card account. To illustrate, a transaction can include a card-based payment transaction to transfer funds from a payment card account to a recipient account (or vice-versa). Additionally, a transaction can include an operation to access information associated with a payment card account including, but not limited to, a personal identification number ("PIN"), account credentials, account details (e.g., available balance), withdrawals/deposits, or other operations that touch data (e.g., a ledger) stored for a payment card account.

In one or more embodiments, in connection with processing transactions involving payment card accounts, the card processing system 114 utilizes the key lifecycle management system 102 to manage lifecycles of cryptographic keys. In particular, the key lifecycle management system 102 communicates with the payment network 108 (e.g., one or more payment card networks) to receive cryptographic keys for encrypting/decrypting messages associated with payment card accounts. Additionally, the key lifecycle management system 102 communicates with the third-party system 110 to provide the cryptographic keys in connection with managing data associated with the payment card accounts. Furthermore, the key lifecycle management system 102 stores metadata associated with cryptographic keys for use in validating the cryptographic keys and forcing key exchanges via the payment network 108.

In one or more embodiments, the key lifecycle management system 102 and/or the card processing system 114 provides an application programming interface ("API") for systems or devices in the system environment 100 to perform operations/transactions associated with payment card accounts. For instance, the key lifecycle management system 102 and/or the card processing system 114 provides an API with tools for managing payment card accounts, card programs associated with the payment card accounts, and managing cryptographic keys (e.g., requesting new keys, transmitting data associated with keys). Additionally, in some embodiments, the key lifecycle management system 102 provides an API for the third-party system 110 to provide data in connection with validating cryptographic keys and/or for exchanging cryptographic keys.

In one or more embodiments, the server(s) 104 include a variety of computing devices, including those described below with reference to FIG. 8. For example, the server(s) 104 includes one or more servers for storing and processing data associated with payment card accounts. In some embodiments, the server(s) 104 also include a plurality of computing devices in communication with each other, such as in a distributed storage environment. In some embodiments, the server(s) 104 communicate with a plurality of issuing systems and issuing system devices or other systems and devices of one or more entities based on established relationships between the card processing system 114, the key lifecycle management system 102, and the one or more entities. To illustrate, the server(s) 104 communicate with various entities or systems including financial institutions (e.g., issuing banks associated with payment cards via the payment network 108), payment card networks associated with processing payment transactions involving payment card accounts, payment cards, payment gateways, merchant systems, client devices, or other systems.

In addition, in one or more embodiments, the card processing system 114 and/or the key lifecycle management system 102 are implemented on one or more servers. For example, the card processing system 114 and/or the key lifecycle management system 102 can be partially or fully implemented on a plurality of servers. To illustrate, the card processing system 114 and the key lifecycle management system 102 can be implemented in a distributed environment. In one or more embodiments, each server handles requests for managing accounts or processing payment transactions. Furthermore, in one or more embodiments, the card processing system 114 and/or the key lifecycle management system 102 include or communicate with a plurality of servers in a distribute database for storing data associated with cryptographic keys.

In one or more embodiments, the client device 106 includes a computing device that initiates electronic payment transactions via the payment network 108. For example, the client device 106 includes a user device, such as a smartphone, desktop computer, laptop, or other computing device that enables electronic payment transactions with one or more entities (e.g., via web applications or standalone applications). In some embodiments, the client device 106 includes a recipient device that hosts a web application or standalone applications and communicates with the payment network 108 to initiate electronic payment transactions. In alternative examples, the client device 106 includes a point-of-sale device including a card reader, chip reader, or other device to initiate electronic payment transactions between a sending user and a recipient user.

Additionally, as shown in FIG. 1, the system environment 100 includes the network 112. The network 112 enables communication between components of the system environment 100. In one or more embodiments, the network 112 may include the Internet or World Wide Web. Additionally, the network 112 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server(s) 104, the card processing system 114, the key lifecycle management system 102, the client device 106, and the third-party system 110 communicate via the network 112 using one or more communication platforms and technologies suitable for transporting data and/or communication signals, including any known communication technologies, devices, media, and protocols supportive of data communications, examples of which are described with reference to FIG. 8. Additionally, in one or more embodiments, one or more of the various components of the system environment 100 communicate using protocols for financial information communications such as PCI standards or other protocols.

Figure 2:
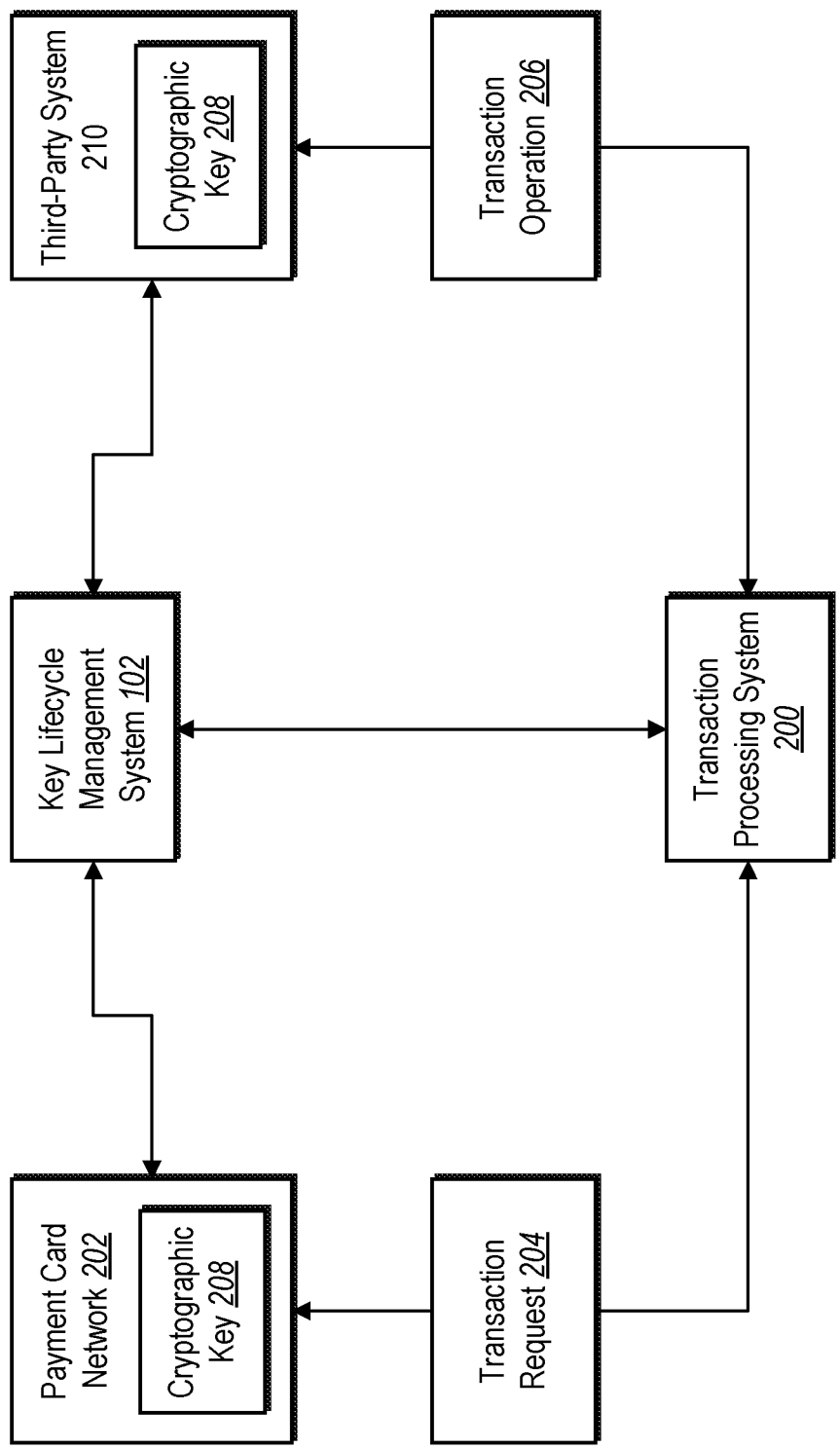
FIG. 2 illustrates a diagram of an overview of the key lifecycle management system managing the use of a cryptographic key for processing transactions in accordance with one or more implementations.

As mentioned, the key lifecycle management system 102 provides lifecycle management of cryptographic keys in connection with payment card accounts. FIG. 2 illustrates an overview of the key lifecycle management system 102 in connection with processing a transaction for a payment card account. In particular, FIG. 2 illustrates that the key lifecycle management system 102 communicates with a transaction processing system to validate a cryptographic key in connection with processing the transaction.

In one or more embodiments, as illustrated in FIG. 2, a transaction processing system 200 (e.g., a card processing system as described with respect to FIG. 1) and a payment card network 202 to initiate a transaction associated with a payment card account. For example, the payment card network 202 sends a transaction request 204 to the transaction processing system 200 to perform a particular transaction associated with the payment card account. To illustrate, the payment card network 202 sends the transaction request 204 in response to receiving a request message from a client device (e.g., a user client device, a point-of-sale device, or an automatic teller machine) to perform a transaction operation 206. Specifically, as mentioned, the transaction operation 206 includes a card processing transaction, a PIN access/change transaction, a withdrawal transaction, etc.

In one or more embodiments, the payment card network 202 encrypts data in the transaction request 204 to securely transmit the data to the transaction processing system 200. Specifically, the payment card network 202 utilizes a cryptographic key 208 to encrypt data associated with the transaction request 204. As used herein, the terms "cryptographic key" or "key" refer to an encryption key for encrypting and/or decrypting data. In one or more embodiments, the cryptographic key 208 includes a symmetric key for encrypting and decrypting information, such as a randomly generated set of bits of a predetermined length. For example, a sending device/system encrypts data utilizing the symmetric key and a recipient device/system decrypts the data utilizing the symmetric key. To illustrate, the payment card network 202 and another system (e.g., a third-party system 210) store the cryptographic key 208 (e.g., separate copies of the cryptographic key 208). Furthermore, in one or more embodiments, the third-party system 210 performs the transaction operation 206 in connection with processing the transaction request 204 in response to decrypting the data utilizing the cryptographic key 208.

Figure 3:
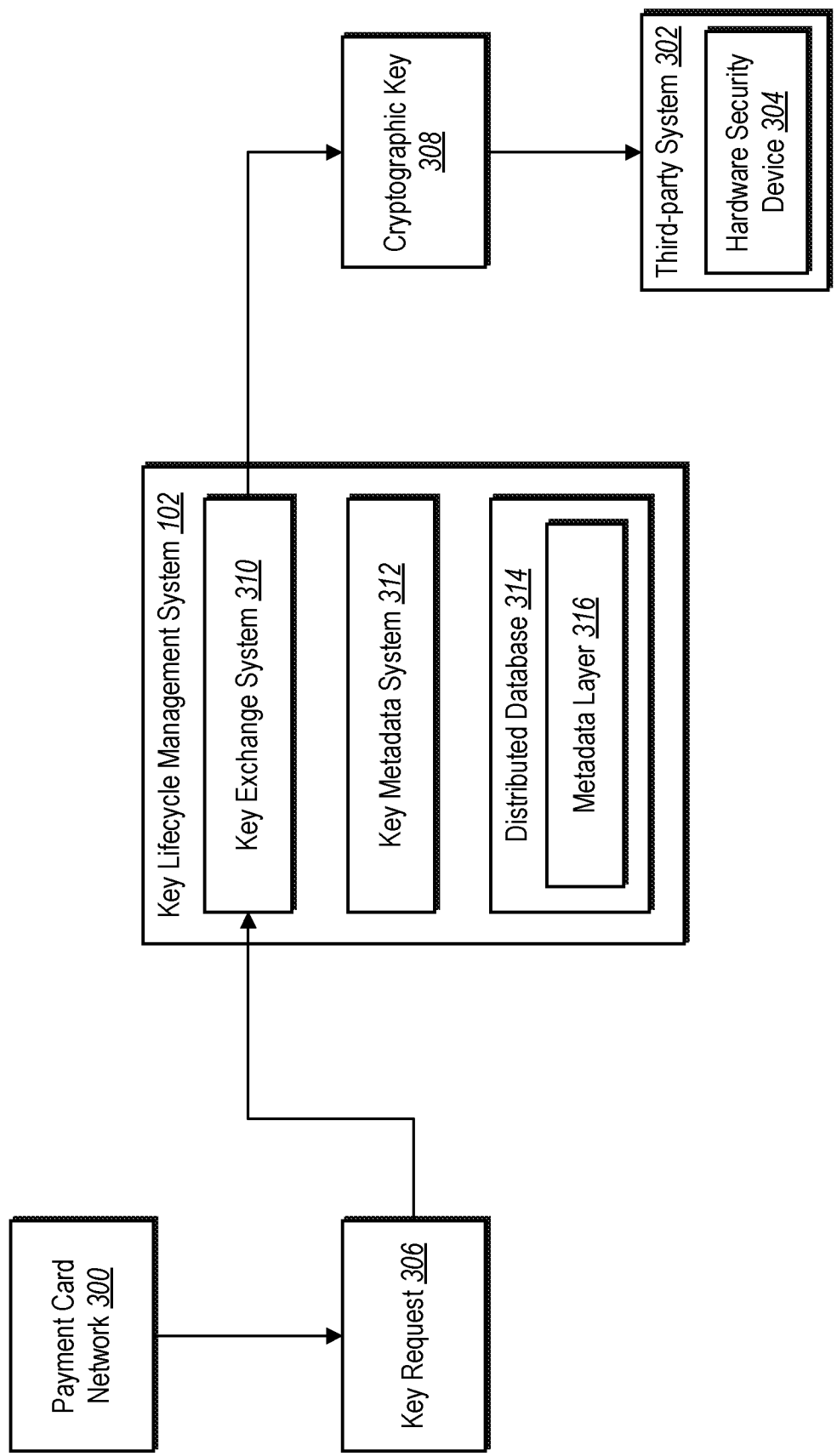
FIG. 3 illustrates a diagram of the key lifecycle management system exchanging a cryptographic key and generating a metadata layer for the cryptographic key in accordance with one or more implementations.
Figure 4:
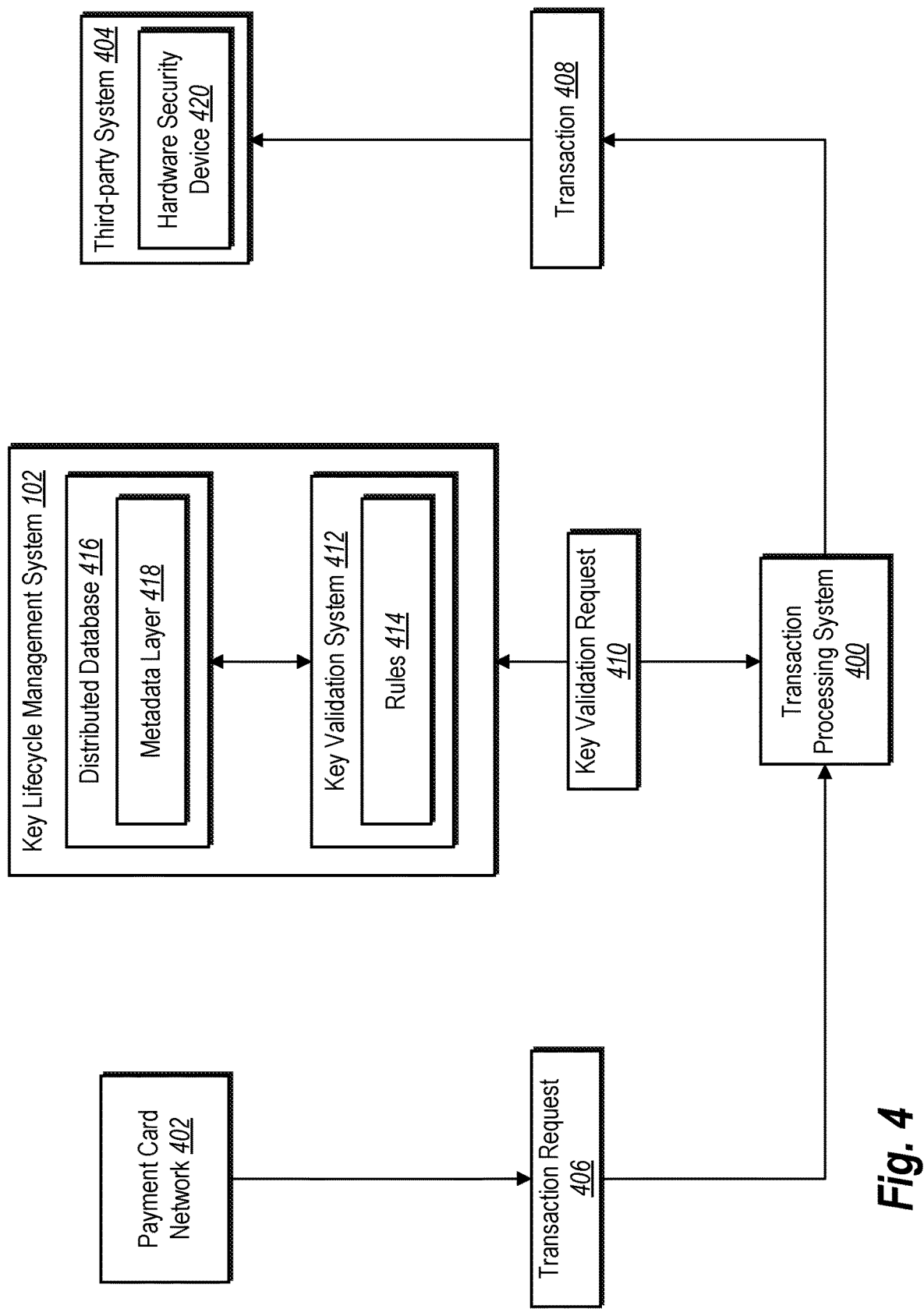
FIG. 4 illustrates a diagram of the key lifecycle management system validating a cryptographic key based on a stored metadata layer for performing a transaction in accordance with one or more implementations.
Figure 5:
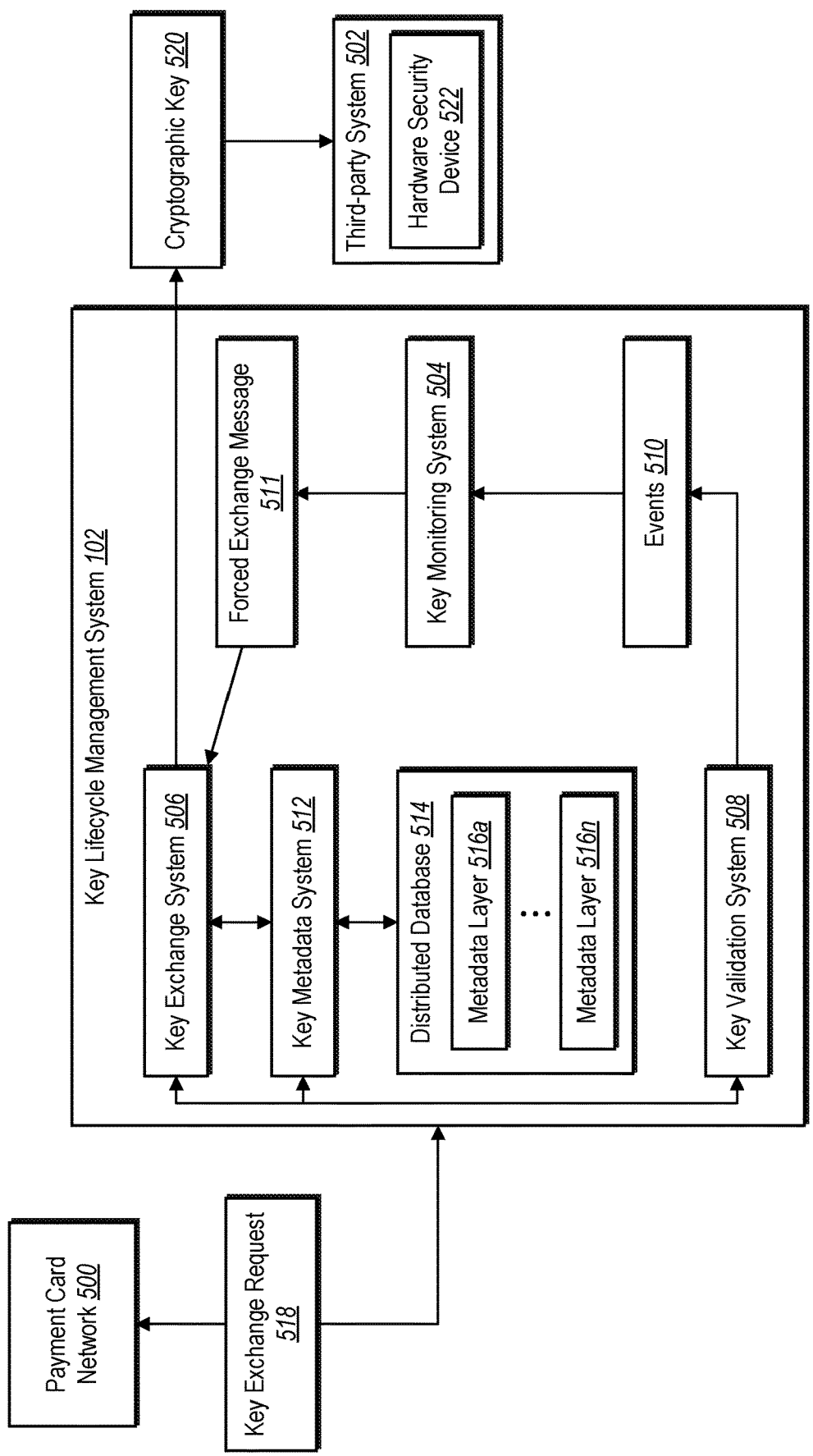
FIG. 5 illustrates a diagram of the key lifecycle management system monitoring events associated with a payment card account and forcing a key exchange in accordance with one or more implementations.

According to one or more embodiments, the key lifecycle management system 102 manages a lifecycle of the cryptographic key 208 by communicating with the transaction processing system 200, the payment card network 202, and/or the third-party system 210. For example, the key lifecycle management system 102 facilitates an initial key exchange/provision from the payment card network 202 to the third-party system 210. Additionally, the key lifecycle management system 102 facilitates validation of the cryptographic key 208 in connection with incoming transactions involving the payment card account. Furthermore, the key lifecycle management system 102 facilitates and/or forces key exchanges to update a version of the cryptographic key 208 between the payment card network 202 and the third-party system 210 by monitoring events associated with the cryptographic key 208. FIGS. 3-5 and the corresponding description provide additional details with respect to the key lifecycle management system 102 managing various aspects of a lifecycle of a cryptographic key.

FIG. 3 illustrates an embodiment of the key lifecycle management system 102 manages the initial exchanges of cryptographic keys generated for payment card accounts. Specifically, FIG. 3 illustrates that the key lifecycle management system 102 communicates with a payment card network 300 and a third-party system 302 to store cryptographic keys for a payment card account within a hardware security device 304 of the third-party system. More specifically, the key lifecycle management system 102 exchanges, stores, and activates cryptographic keys for payment card accounts associated with the third-party system 302 to encrypt and decrypt data associated with processing transactions involving the payment card accounts.

In one or more embodiments, as illustrated in FIG. 3, the key lifecycle management system 102 receives a key request 306 to exchange/store a cryptographic key 308 at the hardware security device 304 of the third-party system 302. In particular, the payment card network 300 can send the key request 306 to the key lifecycle management system 102 in connection with setting up a payment card account (e.g., in an initial key exchange) or in connection with communicating with a new participant system. Alternatively, the payment card network 300 can send the key request 306 in connection with a predetermined key exchange time period. For instance, the payment card network 300 can rotate a key for a payment card account after a predetermined amount of time has passed since a previous key exchange operation (e.g., based on an activation date and/or an expiration date of a cryptographic key). In additional embodiments, the payment card network 300 sends the key request 306 in response to a key exchange request from the key lifecycle management system 102 or the third-party system 302.

According to one or more embodiments, the key lifecycle management system 102 includes a key exchange system 310 to communicate with the payment card network 300 during a key exchange operation. For example, the key exchange system 310 receives the key request 306 from the payment card network 300 to initiate and handle key exchange processes with the payment card network 300. In one or more embodiments, the key request 306 includes the cryptographic key 308 and additional details associated with the cryptographic key 308. Furthermore, the key exchange system 310 extracts the cryptographic key 308 and sends the cryptographic key 308 to the third-party system 302 for storing in the hardware security device 304.

In one or more embodiments, the hardware security device 304 (also referred to in existing systems as a "hardware security module") includes a physical computing device (or device(s)) specifically designated to manage cryptographic keys. For example, the hardware security device 304 stores the cryptographic keys for performing encryption and decryption operations for authenticating transaction requests. Additionally, as illustrated in FIG. 3, the hardware security device 304 is part of the third-party system 302, which can include one or more devices associated with a participating institution involved in card-based payment transactions. To illustrate, the third-party system 302 includes the hardware security device 304 to manage cryptographic keys and encryption/decryption tasks and one or more additional computing devices in communication with the hardware security device 304 (e.g., attached directly to the hardware security device 304) to perform one or more tasks based on encrypted/decrypted data.

As illustrated in FIG. 3, in one or more embodiments, the key lifecycle management system 102 also includes a key metadata system 312 to perform one or more operations associated with key exchange operations. Specifically, the key metadata system 312 communicates with the key exchange system 310 to obtain data associated with the cryptographic key 308 from the key request 306. For instance, the key metadata system 312 extracts a plurality of attributes associated with the cryptographic key 308 from the key request 306. In one or more embodiments, the extracted attributes indicate characteristics of the cryptographic key 308 that allow the key lifecycle management system 102 to identify the cryptographic key 308 and verify whether the cryptographic key 308 is valid at any given point in time.

To illustrate, the key metadata system 312 extracts a version number of the cryptographic key 308, geographic location information (e.g., a geolocation tag) associated with the cryptographic key 308, or one or more timestamps associated with the cryptographic key 308. In one or more examples, the key metadata system 312 extracts an activation timestamp indicating when the payment card network 300 activated the cryptographic key 308 and an expiration timestamp indicating when the cryptographic key 308 is no longer valid. In additional embodiments, the key metadata system 312 extracts a network identifier associated with the payment card network 300. In one or more further embodiments, the key metadata system 312 determines a payment card account associated with the cryptographic key 308.

According to one or more embodiments, in response to extracting metadata associated with the cryptographic key 308, the key metadata system 312 stores the extracted data as metadata within a distributed database 314. In one or more embodiments, the distributed database 314 comprises a plurality of servers at a plurality of different physical locations to provide redundancy in the stored data (e.g., in a cloud-based storage system). Additionally, in some embodiments, the distributed database 314 includes servers corresponding to specific geographic regions that correspond to geographic regions identified in connection with card-based transactions. In alternative embodiments, the key lifecycle management system 102 utilizes a centralized database at a single location to store metadata associated with the cryptographic key 308.

In one or more embodiments, the key metadata system 312 stores the metadata extracted for the cryptographic key 308 by generating a metadata layer 316. In particular, the key metadata system 312 generates the metadata layer 316 to include a plurality of fields based on the extracted attributes of the cryptographic key 308. For instance, the key metadata system 312 generates, within the metadata layer 316, a first field including a mapping of the cryptographic key 308 to the metadata layer 316, a second field including a version number of the cryptographic key 308, a third field including a geolocation tag of the cryptographic key 308, a fourth field including an activation timestamp of the cryptographic key 308, and a fifth field including an expiration timestamp of the cryptographic key 308. In additional embodiments, the key metadata system 312 generates a field including an identifier of the payment card network 300.

In at least some embodiments, the key lifecycle management system 102 determines the version number of the cryptographic key 308 in connection with supporting a plurality of cryptographic keys. For example, the payment card network 300 can generate different versions of a cryptographic key for a payment card account in connection with rotating the cryptographic key. In some instances, the payment card network 300 can generate different versions of a cryptographic key for different purposes—e.g., a first version for use with a first type of transaction corresponding to the payment card account and a second version for use with a second type of transaction corresponding to the payment card account. Thus, the key lifecycle management system 102 can determine different versions of a cryptographic key corresponding to a single payment card account and generate different metadata layers for the different versions of the cryptographic key 308. As described in more detail below, the key lifecycle management system 102 can utilize the different metadata layers and geofencing (e.g., based on geolocation tags) to validate different versions of the cryptographic key according to specific transaction requests.

According to one or more embodiments, the key lifecycle management system 102 sends the cryptographic key 308 to the third-party system 302 in response to generating the metadata layer 316. For example, in response to determining that the key metadata system 312 stored the metadata extracted from the key request 306 in the metadata layer 316 at the distributed database 314, the key exchange system 310 sends the cryptographic key 308 to the hardware security device 304. Thus, the key lifecycle management system 102 can verify that the cryptographic key is valid (e.g., all of the required information is present) prior to providing the cryptographic key 308 for storage at the hardware security device 304. In alternative embodiments, the key lifecycle management system 102 sends the cryptographic key 308 to the third-party system 302 prior to or otherwise in connection with generating the metadata layer 316.

In one or more embodiments, in response to the key metadata system 312 generating the metadata layer 316 at the distributed database 314 and the key exchange system 310 storing the cryptographic key 308 at the hardware security device 304 of the third-party system 302, the key lifecycle management system 102 determines that the key exchange operation is complete. For example, the key lifecycle management system 102 sends a response to the key request 306 to the payment card network 300 indicating that the key exchange operation is complete/successful. In additional embodiments, the key lifecycle management system 102 sends an indication to the third-party system 302 that the key exchange operation is complete, which causes the third-party system 302 to commit storage of the cryptographic key 308 at the hardware security device 304.

According to one or more embodiments, the key lifecycle management system 102 manages additional lifecycle aspects of cryptographic key after a key exchange operation. FIG. 4 illustrates that the key lifecycle management system 102 utilizes validates a cryptographic key in connection with subsequent transactions. Specifically, FIG. 4 illustrates that the key lifecycle management system 102 utilizes metadata in a previously generated metadata layer to determine whether to validate a transaction corresponding to the cryptographic key. FIG. 4 illustrates that a transaction processing system 400 communicates with a payment card network 402, a third-party system 404, and the key lifecycle management system 102 to process a transaction associated with a payment card account. In one or more embodiments, the transaction processing system 400 and the key lifecycle management system 102 are part of a card processing system that processes transactions associated with a payment card account.

As illustrated in FIG. 4, the payment card network 402 sends a transaction request 406 to the transaction processing system 400 in connection with performing a transaction 408 involving a payment card account. For example, the payment card network 402 generates the transaction request 406 in response to a request by one or more other systems/devices to perform the transaction 408 in connection with the payment card account. To illustrate, the payment card network 402 receives, via a payment gateway system, a request to process a card-based payment transaction involving the payment card account, such as a fund transfer (e.g., peer-to-peer transfer, peer-to-merchant transfer) or a withdrawal/debit transaction. In additional embodiments, the payment card network 402 receives a request to access or modify one or more account details (e.g., personal information, PIN, balance) associated with the payment card account.

In one or more embodiments, the payment card network 402 generates the transaction request 406 by including one or more transaction details associated with the transaction 408. For example, the payment card network 402 can generate the transaction request 406 to include the transaction 408, one or more timestamps associated with the transaction request 406, a geolocation tag associated with the transaction request 406, etc. Additionally, the payment card network 402 can encrypt the transaction request 406 utilizing a cryptographic key associated with the payment card network to securely transmit the transaction request 406 to the transaction processing system 400.

According to one or more embodiments, in response to receiving the transaction request 406 from the payment card network 402, the transaction processing system 400 communicates with the key lifecycle management system 102 to validate the transaction request 406. Specifically, as illustrated in FIG. 4, the transaction processing system 400 sends a key validation request 410 to validate the cryptographic key associated with the transaction request 406. For example, the transaction processing system 400 sends the key validation request 410 to the key lifecycle management system 102 in response to receiving the transaction request 406. In some embodiments, the transaction processing system 400 generates the key validation request 410 to include the cryptographic key associated with the transaction request 406. In alternative embodiments, the transaction processing system 400 generates the key validation request 410 to include an identifier of the cryptographic key without including the cryptographic key itself.

In one or more embodiments, the key lifecycle management system 102 validates the cryptographic key in response to the key validation request 410. In particular, as illustrated in FIG. 4, the key lifecycle management system 102 includes a key validation system 412 to determine whether the cryptographic key associated with the transaction request 406 is valid. For example, the key validation system 412 utilizes a set of rules 414 to validate the cryptographic key (and thus the transaction request 406). To illustrate, the rules 414 include one or more comparisons to previously extracted metadata corresponding to the cryptographic key, such as one or more comparisons based on a version number, geolocation tag, and/or timestamps associated with the cryptographic key.

As illustrated in FIG. 4, in one or more embodiments, the key validation system 412 accesses a distributed database 416 that includes metadata associated with one or more cryptographic keys. Specifically, the distributed database 416 includes a metadata layer 418 including a plurality of fields based on attributes extracted during a previous key exchange operation for the cryptographic key. In one or more embodiments, the key validation system 412 accesses the metadata layer 418 via a key metadata system (e.g., the key metadata system 312 of FIG. 3). For example, the key validation system 412 accesses the metadata layer 418 based on a mapping between the cryptographic key and the metadata layer 418 (e.g., based on an identifier or other value of the cryptographic key).

In response to accessing the metadata layer 418, the key validation system 412 utilizes the rules 414 to determine whether specific attributes of the transaction request 406 (and corresponding cryptographic key) match data in the metadata layer 418. For instance, the key validation system 412 determines whether a version number of the cryptographic key corresponding to the transaction request 406 matches a version number stored in the metadata layer 418. To illustrate, the key validation system 412 determines that version N of the cryptographic key matches version N stored in the metadata layer 418, rather than version N+1 or version N−1.

In additional examples, the key validation system 412 determines that a geolocation tag associated with the transaction request 406 corresponds to metadata of the metadata layer 418. In particular, the key validation system 412 determines whether the geolocation tag of the transaction request 406 (e.g., indicating an originating location of a request to initiate a transaction) matches a geolocation tag in the metadata layer 418. To illustrate, if the geolocation tag of the transaction request 406 indicates that the transaction request 406 corresponds to a US West geolocation, and the geolocation stored in the metadata layer 418 associated with the cryptographic key corresponds to a US East geolocation or a Europe West geolocation, the key validation system 412 determines that the cryptographic key is not valid for the transaction request 406. Alternatively, in response to determining that the transaction request 406 and the cryptographic key correspond to the same geolocation, the key validation system 412 determines that the cryptographic key is valid for the transaction request 406. The key validation system 412 can thus use geofencing to validate transaction requests.

In one or more embodiments, the key lifecycle management system 102 utilizes geolocation information to determine events for forcing key exchanges. In particular, as described in more detail with respect to FIG. 5 below, the key lifecycle management system 102 can detect a geolocation-based event in response to determining that the geolocation tag of the transaction request 406 is different than the geolocation information stored in the metadata layer 418 associated with the cryptographic key. For example, the key validation system 412 determines that differences between the geolocation tag in the transaction request 406 and the geolocation information in the metadata layer 416 indicate that the cryptographic key is compromised. Accordingly, the key lifecycle management system 102 can force a key exchange to replace the possibly compromised cryptographic key.

In one or more embodiments, the key validation system 42 utilizes the metadata of the metadata layer 418 to validate one or more timestamps associated with the transaction request 406. For instance, the key validation system 412 determines whether a timestamp associated with the transaction request 406 indicates validity based on an activation timestamp in the metadata layer 418. To illustrate, in response to determining that the timestamp of the transaction request 406 is chronologically prior to the activation timestamp in the metadata layer 418, the key validation system 412 determines that the corresponding cryptographic key is not valid at the time of the transaction request 406 (e.g., the key was not activated at the time of the transaction request).

Additionally, the key validation system 412 can determine whether a timestamp associated with the transaction request 406 indicates validity based on an expiration timestamp in the metadata layer 418. For example, in response to determining that the timestamp of the transaction request 406 is chronologically after the expiration timestamp in the metadata layer 418, the key validation system 412 determines that the corresponding cryptographic key is not valid at the time of the transaction request 406 (e.g., the key has already expired). Alternatively, in response to determining that the timestamp of the transaction request 406 does not fall outside the activation/expiration time period for the cryptographic key according to the metadata layer 418, the key validation system 412 can determine that the cryptographic key may be (but is not necessarily) valid for the transaction request 406. To illustrate, the key validation system 412 can determine that the cryptographic key is valid for the transaction request 406 in response to determining that the transaction request 406 is valid under each of the rules 414 (e.g., the version number matches, the geolocation tag matches, and the timestamps are valid).

In one or more embodiments, the key validation system 412 also determines one or more rules according to one or more standards associated with processing payment card transactions. For example, the key validation system 412 determines one or more rules based on data retention and/or data localization standards. To illustrate, the key validation system 412 determines a rule based on geolocation tags according to PCI standards. In additional embodiments, the key validation system 412 determines a rule corresponding to a lifespan (e.g., total valid time) of a cryptographic key based on one or more payment card processing standards.

According to one or more embodiments, in response to determining that a cryptographic key is valid or not valid for the transaction request 406 based on the rules 414 and the metadata layer 418, the key lifecycle management system 102 sends a response to the transaction processing system 400. Specifically, the key lifecycle management system 102 sends the response to indicate that the cryptographic key is valid or not valid for the transaction request 406. The transaction processing system 400 can perform the transaction 408 in response to determining that the cryptographic key is valid for the transaction request 406. To illustrate, the transaction processing system 400 sends the transaction 408 (e.g., instructions for processing the transaction 408) to the third-party system 404 to perform the transaction 408.

For instance, the transaction processing system 400 provides the transaction 408 to the third-party system 404 to process utilizing the cryptographic key. In one or more embodiments, the third-party system 404 accesses the cryptographic key from the hardware security device 420 in response to receiving the transaction 408. Additionally, the third-party system 404 decrypts data associated with the transaction 408 (e.g., a message including the transaction 408) utilizing the cryptographic key. In at least some embodiments, the third-party system 404 utilizes the hardware security device 420 to decrypt the data associated with the transaction 408 via the cryptographic key.

In one or more embodiments, in response to decrypting data associated with the transaction 408, the third-party system 404 also performs the transaction 408 by processing computing instructions associated with the transaction 408. To illustrate, the third-party system 404 processes the computing instructions to perform the transaction 408 including, but not limited to, accessing a ledger associated with the payment card account, accessing/modifying a PIN associated with the payment card account, authorizing a PIN-debit transaction or an ATM withdrawal involving the payment card account, or otherwise transferring funds out of or into the payment card account. In some embodiments, performing the transaction 408 involves the transaction processing system 400, the key lifecycle management system 102, and/or one or more other systems communicating with the third-party system 404 to process instructions associated with the transaction 408 for the payment card account. For instance, in connection with performing the transaction 408, the key lifecycle management system 102 communicates with the third-party system 404 to indicate the validity of the cryptographic key for the transaction request 406 or storing data associated with the transaction 408 in the metadata layer 418.

In one or more embodiments, in addition to validating cryptographic keys for performing transactions associated with payment card accounts, the key lifecycle management system 102 also provides monitoring of cryptographic keys. FIG. 5 illustrates the key lifecycle management system 102 monitoring events associated with a cryptographic key to determine when to exchange the cryptographic key. Specifically, the key lifecycle management system 102 utilizes key validation and anomaly detection to force a key exchange operation to update a cryptographic key to a new version. FIG. 5 illustrates that the key lifecycle management system 102 communicates with a payment card network 500 and a third-party system 502 to detect events and force key exchange operations.

As illustrated in FIG. 5, in one or more embodiments, the key lifecycle management system 102 includes a key monitoring system 504 to communicate with a key exchange system 506 and a key validation system 508. Specifically, the key lifecycle management system 102 utilizes the key monitoring system 504 to determine whether to force a key exchange operation based on specific triggers. For example, the key validation system 508 emits events 510 to the key monitoring system 504 in connection with a cryptographic key for a payment card account. Additionally, based on the events 510, the key monitoring system 504 determines whether to force a key exchange and generates a forced exchange message 511 to send to the key exchange system 506. Furthermore, the key exchange system 506 negotiates exchange for a new version of the cryptographic key.

According to one or more embodiments, as mentioned, the key lifecycle management system 102 utilizes the key validation system 508 to detect events 510. Specifically, in connection with validating a cryptographic key, the key validation system 508 communicates with the key exchange system 506 to validate a cryptographic key in connection with a transaction request. For instance, the key validation system 508 communicates with the key exchange system 506 and/or a key metadata system 512 to obtain metadata stored for the cryptographic key at the key lifecycle management system 102. To illustrate, the key metadata system 512 communicates with a distributed database 514 to access a metadata layer (e.g., a first metadata layer 516a or an nth metadata layer 516n) corresponding to the specific version of the cryptographic key. As previously mentioned, the key lifecycle management system 102 generates the metadata layer corresponding to the cryptographic key during a prior time period based on data provided to the key lifecycle management system 102 for the cryptographic key (e.g., in a key request from the payment card network 500).

In one or more embodiments, the key metadata system 512 provides the metadata from the metadata layer to the key validation system 508. The key validation system 508 utilizes the received metadata to validate the cryptographic key and/or to detect one or more events associated with the cryptographic key. For example, the key validation system 508 detects one or more key validation events in response to validating the cryptographic key. To illustrate, in response to determining that the cryptographic key is not valid for a particular transaction request based on the metadata, the key validation system 508 detects a "validation failed" event. In connection with detecting the key validation event, the key validation system 508 emits the key validation event to the key monitoring system 504.

In one or more embodiments, the key validation system 508 emits the events 510 including types of detected events along with additional information about specific data. For example, the key validation system 508 determines details associated with a particular transaction request, a payment card account, or a cryptographic key. To illustrate, the key validation system 508 determines details including, but not limited to, a payment/transaction type, the payment card network 500, a geographic region of the transaction request and/or the cryptographic key, and timestamps associated with the transaction request and/or the cryptographic key.

In additional embodiments, the key monitoring system 504 utilizes the events 510 to detect one or more anomaly events associated with the cryptographic key. For instance, the key monitoring system 504 determines whether one or more timestamps in the events 510 indicate invalidity of the cryptographic key. To illustrate, the key monitoring system 504 determines that a current time or a timestamp associated with a transaction request indicates that the cryptographic key is not activated according to the activation timestamp in the metadata. In another example, the key monitoring system 504 determines that a current time or a timestamp associated with a transaction request indicates that the cryptographic key is expired according to the expiration timestamp in the metadata.

In one or more embodiments, the key monitoring system 504 also detects anomaly events in response to explicit requests to rotate cryptographic keys. For example, the third-party system 502 or another system can send a request to the key lifecycle management system 102 to rotate a cryptographic key for a payment card account. The key monitoring system 504 can determine that the request indicates an anomaly and generate the forced exchange message 511 in response to the detected anomaly.

According to one or more embodiments, the key monitoring system 504 also utilizes historical patterns associated with the cryptographic key and/or other cryptographic keys to detect anomaly events and/or determine that the anomaly events indicate a time for a new cryptographic key. In particular, the key monitoring system 504 analyzes historical data associated with one or more payment card accounts to detect outliers, changes in events, or drifts in data patterns in connection with a cryptographic key. More specifically, the key monitoring system 504 can detect anomaly events in response to aggregated cryptographic operation failures occurring at a layer above a payment card account level (e.g., a regional level). To illustrate, in response to receiving a high number of "validation failed" events from a particular region (e.g., a threshold number of events from the US East region for one or more payment card accounts) for the payment card network 500, the key monitoring system 504 detects an anomaly event. In additional embodiments, in response to detecting a geographic outlier transaction request for a payment card account, the key monitoring system 504 detects an anomaly event indicating that a cryptographic key is compromised.

In response to detecting an anomaly event, the key monitoring system 504 generates a forced exchange message 511 to send to the key exchange system 506. Specifically, the key monitoring system 504 generates the forced exchange message 511 indicating a request to exchange a cryptographic key with a new version of the cryptographic key. For example, the forced exchange message 511 includes instructions (e.g., an API call) that cause the key exchange system 506 to initiate a key exchange operation with the payment card network 500. In some embodiments, the forced exchange message 511 includes a current version (e.g., version N) of the cryptographic key with a request to update to a new version (e.g., version N+1).

In one or more embodiments, in response to receiving the forced exchange message 511, the key exchange system 506 generates a key exchange request 518 to send to the payment card network 500. In particular, the key exchange request 518 includes an indication of the cryptographic key (or the payment card account) and/or a version number of the cryptographic key. In some instances, the key exchange request 518 can include additional information about the cryptographic key and/or a reason for the forced key exchange. In some embodiments, the key exchange system 506 submits the key exchange request 518 via an API call to the payment card network 500.

Additionally, in response to the key exchange request 518, the payment card network 500 updates the cryptographic key to a new version (e.g., by generating a new cryptographic key). The payment card network 500 sends the new version of the cryptographic key to the key lifecycle management system 102 (e.g., to the key exchange system 506). In one or more embodiment, in response to receiving the new version of the cryptographic key from the payment card network 500, the key exchange system 506 utilizes the key metadata system 512 to generate a new metadata layer for the new version of the cryptographic key. For example, the key metadata system 512 extracts attributes associated with the new version of the cryptographic key from the key exchange request 518 and communicates with the distributed database 514 to store the extracted data in a new metadata layer. The key lifecycle management system 102 also invalidates previous metadata layers (e.g., the first metadata layer 516a and the nth metadata layer 516n) in response to the forced exchange message 511.

Furthermore, the key exchange system 506 sends the new version of the cryptographic key (illustrated as cryptographic key 520 in FIG. 5) to the third-party system 502. In one or more embodiments, the third-party system 502 stores the cryptographic key 520 at a hardware security device 522 for use in decrypting transaction requests associated with a corresponding payment card account. In one or more embodiments, the third-party system 502 maintains the previous version of the cryptographic key 520 at the hardware security device 522 until receiving the updated version of the cryptographic key 520. In response to receiving the new version of the cryptographic key 520 from the key exchange system 506, the third-party system 502 removes the previous version of the cryptographic key 520 from the hardware security device 522 to prevent use of the previous version of the cryptographic key 520 in connection with subsequent transaction requests.

Although FIG. 5 illustrates an embodiment in which the key monitoring system 504 forces a key exchange operation for a payment card account to invalidate any previously activated keys, the key lifecycle management system 102 also provides key exchange operations during predetermined time periods or events without invalidating previously activated keys. As mentioned, rotating/exchanging versions of a cryptographic key can take a certain amount of time (e.g., up to several hours). Because the key lifecycle management system 102 maintains separate metadata layers for separate versions of a cryptographic key, the key lifecycle management system 102 provides support for the separate versions in connection with transaction requests. Thus, in response to receiving a transaction request encrypted using a previous version of the cryptographic key, the key lifecycle management system 102 can validate (or invalidate) the previous version via the corresponding metadata layer (e.g., via the timestamps and/or geolocation tags), such that the key lifecycle management system 102 does not erroneously reject transaction requests during the exchange time period.

Additionally, in one or more embodiments, the key lifecycle management system 102 maintains metadata for old versions of cryptographic keys for a particular amount of time. For example, the key lifecycle management system 102 maintains a metadata layer for a previous version of a cryptographic key (e.g., version N−1) for a predetermined amount of time after sending a key exchange request. In some examples, the key lifecycle management system 102 maintains the metadata layer for the previous version until verifying that the third-party system 502 has stored the newest version of the cryptographic key at the hardware security device 522. The key lifecycle management system 102 can also remove/delete metadata layers for cryptographic keys that are no longer valid (e.g., expired keys for which the key monitoring system 504 detects anomaly events).

Figure 6:
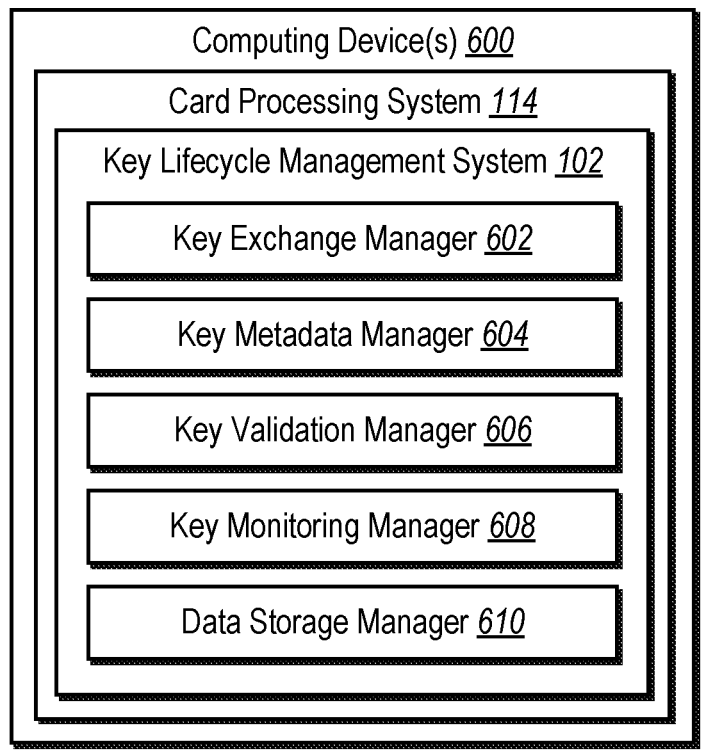
FIG. 6 illustrates a diagram of the key lifecycle management system of FIG. 1 in accordance with one or more implementations.

FIG. 6 illustrates a detailed schematic diagram of an embodiment of the key lifecycle management system 102 described above. As shown, key lifecycle management system 102 is implemented in a card processing system 114 on computing device(s) 600 (e.g., a client device and/or server device as described in FIG. 1, and as further described below in relation to FIG. 8). Additionally, the key lifecycle management system 102 includes, but is not limited to, a key exchange manager 602, a key metadata manager 604, a key validation manager 606, a key monitoring manager 608, and a data storage manager 610. The key lifecycle management system 102 can be implemented on any number of computing devices. For example, the key lifecycle management system 102 can be implemented in a distributed system of server devices for digital content editing tasks. The key lifecycle management system 102 can also be implemented within one or more additional systems. Alternatively, the key lifecycle management system 102 can be implemented on a single computing device such as a single client device.

In one or more embodiments, each of the components of the key lifecycle management system 102 is in communication with other components using any suitable communication technologies. Additionally, the components of the key lifecycle management system 102 are capable of being in communication with one or more other devices including other computing devices of a user, server devices (e.g., cloud storage devices), licensing servers, or other devices/systems. It will be recognized that although the components of the key lifecycle management system 102 are shown to be separate in FIG. 8, any of the subcomponents may be combined into fewer components, such as into a single component, or divided into more components as may serve a particular implementation. Furthermore, although the components of FIG. 8 are described in connection with the key lifecycle management system 102, at least some of the components for performing operations in conjunction with the key lifecycle management system 102 described herein may be implemented on other devices within the environment.

In some embodiments, the components of the key lifecycle management system 102 include software, hardware, or both. For example, the components of the key lifecycle management system 102 include one or more instructions stored on a computer-readable storage medium and executable by processors of one or more computing devices (e.g., the computing device(s) 600). When executed by the one or more processors, the computer-executable instructions of the key lifecycle management system 102 cause the computing device(s) 600 to perform the operations described herein. Alternatively, the components of the key lifecycle management system 102 include hardware, such as a special purpose processing device to perform a certain function or group of functions. Additionally, or alternatively, the components of the key lifecycle management system 102 include a combination of computer-executable instructions and hardware.

As illustrated in FIG. 6, the key lifecycle management system 102 includes a key exchange manager 602 to manage the exchange of cryptographic keys. For example, the key exchange manager 602 communicates with payment card networks and third-party systems (e.g., participant systems in payment card transactions) to exchange cryptographic keys. Additionally, the key exchange manager 602 communicates with one or more other components (e.g., the key metadata manager 604) to provide data obtained from payment card networks in connection with exchanging cryptographic keys.

The key lifecycle management system 102 also includes the key metadata manager 604 to determine metadata associated with cryptographic keys. For example, the key metadata manager 604 manages a database of metadata (e.g., a distributed database) by generating metadata layers including data associated with cryptographic keys. Additionally, the key metadata manager 604 communicates with the key validation manager 606 to provide metadata from metadata layers in connection with validating cryptographic keys for transaction requests.

The key lifecycle management system 102 includes the key validation manager 606 to manage the validation of cryptographic keys in connection with transaction requests. Specifically, the key validation manager 606 stores a set of rules for validating transaction requests against metadata stored by the key metadata manager 604. To illustrate, the key validation manager 606 uses metadata associated with cryptographic keys, such as version numbers, timestamps, or geolocation tags.

In one or more embodiments, the key lifecycle management system 102 includes the key monitoring manager 608 to monitor events associated with cryptographic keys. For instance, the key monitoring manager 608 receives events emitted by the key validation manager 606 associated with cryptographic keys. The key monitoring manager 608 utilizes the events to detect anomalies involving the cryptographic keys. In response to detecting anomalies, the key monitoring manager 608 forces key exchange operations via the key exchange manager 602.

The key lifecycle management system 102 also includes a data storage manager 610 (that comprises a non-transitory computer memory/one or more memory devices) that stores and maintains data associated with managing cryptographic keys. For example, the data storage manager 610 stores metadata associated with cryptographic keys. To illustrate, the data storage manager 610 stores version numbers, timestamps, geolocation tags, and historical data associated with the cryptographic keys and/or corresponding payment card accounts.

Figure 7:
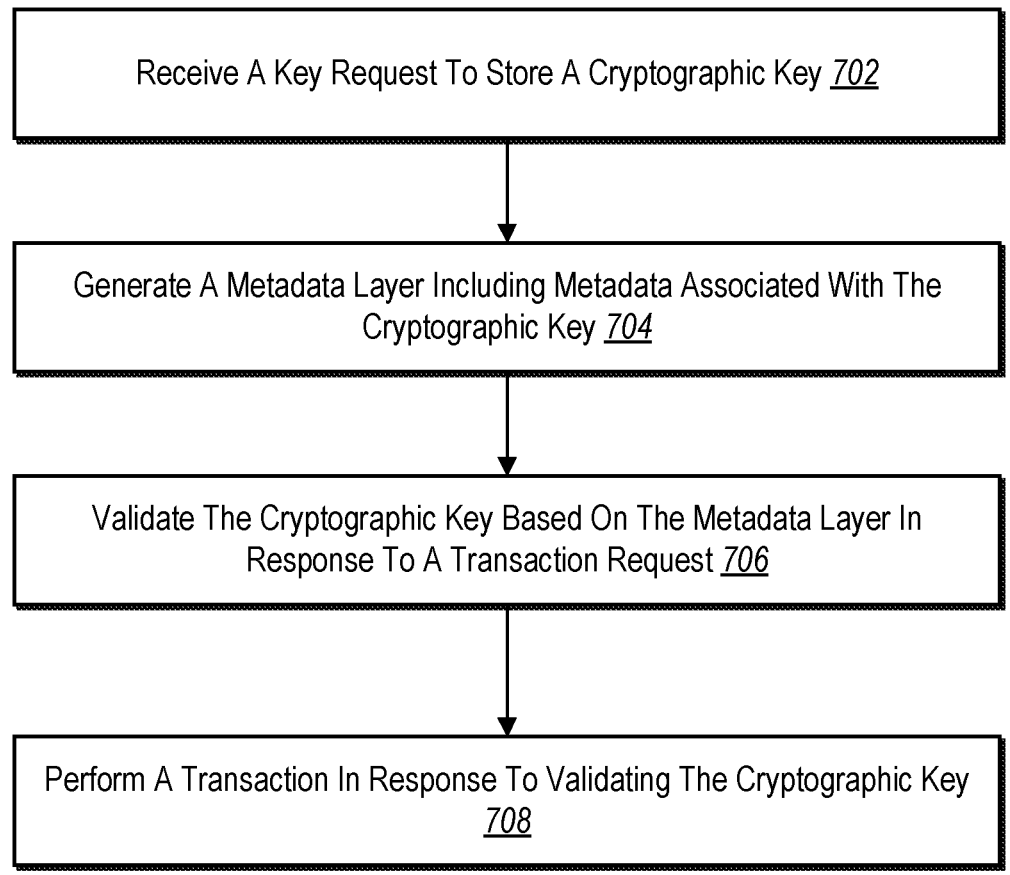
FIG. 7 illustrate a flowchart of a series of acts for generating metadata layer based on a cryptographic key for validating the cryptographic key in connection with a transaction request in accordance with one or more implementations.

Turning now to FIG. 7, this figure shows a flowchart of a series of acts 700 of generating metadata layer based on a cryptographic key for validating the cryptographic key in connection with a transaction request. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable storage medium can comprise instructions, that when executed by one or more processors, cause a computing device to perform the acts of FIG. 7. In still further embodiments, a system can perform the acts of FIG. 7.

As shown in FIG. 7, the series of acts 700 includes an act 702 of receiving a key request to store a cryptographic key. For example, act 702 involves receiving a key request to store a cryptographic key for a payment card account in a hardware security device associated with a third-party system.

The series of acts 700 also includes an act 704 of generating a metadata layer including metadata associated with the cryptographic key. For example, act 704 involves generating, within a distributed database of the card processing system, a metadata layer comprising metadata associated with the cryptographic key in response to the key request.

Act 704 can involve extracting a plurality of attributes of the cryptographic key from the key request, and generating, based on the plurality of attributes, the metadata layer comprising a plurality of fields associated with the cryptographic key within the distributed database. For example, act 704 involves extracting a version number associated with the cryptographic key, determining an activation timestamp and an expiration timestamp associated with the cryptographic key, and determining a geolocation tag associated with the cryptographic key.

Additionally, the series of acts 700 includes an act 706 of validating the cryptographic key based on the metadata layer in response to a transaction request. For example, act 706 involves validating, in response to a transaction request comprising the cryptographic key, the cryptographic key based on the metadata layer comprising the metadata associated with the cryptographic key. Act 706 can involve verifying data associated with the cryptographic key in the transaction request according to the version number and the one or more timestamps in the metadata layer.

Act 706 can involve extracting one or more attributes from the transaction request. Act 706 can involve comparing the one or more attributes of the transaction request to the metadata of the metadata layer associated with the cryptographic key according to a set of rules. For example, act 706 can involve verifying a version number of the cryptographic key and one or more timestamps associated with the cryptographic key from the metadata layer. Act 706 can also involve comparing a geolocation tag to metadata of the metadata layer associated with the cryptographic key.

The series of acts 700 further includes an act 708 of performing a transaction in response to validating the cryptographic key. For example, act 708 involves performing, in connection with the hardware security device associated with the third-party system, a transaction corresponding to the transaction request in response to validating the cryptographic key. Act 708 can involve performing a transaction including a transfer of funds involving the payment card account or accessing details of the payment card account.

The series of acts 700 can include detecting one or more events in connection with validating the cryptographic key or based on historical data associated with the payment card account. For example, the series of acts 700 can include detecting an indication of a failed validation of the cryptographic key according to the metadata of the metadata layer. The series of acts 700 can also include detecting an indication of an anomaly associated with the cryptographic key based on the metadata of the metadata layer and historical patterns associated with the payment card account. The series of acts 700 can also include providing, to a payment card network, a key exchange request in response to the one or more events.

The series of acts 700 can include detecting an anomaly event in connection with one or more payment card accounts including the payment card account. The series of acts 700 can also include providing, to a payment card network in response to the anomaly event, a key exchange request to exchange the cryptographic key with a new cryptographic key. The series of acts 700 can also include generating, in response to receiving the new cryptographic key from the payment card network, a new metadata layer comprising metadata associated with the new cryptographic key within the distributed database.

In one or more embodiments, the series of acts 700 includes detecting one or more events in connection with validating the cryptographic key or based on historical data associated with the payment card account. The series of acts 700 can also include exchanging the cryptographic key with a new cryptographic key by sending a key exchange request to a payment card network in response to the one or more events and generating a new metadata layer comprising new metadata corresponding to the new cryptographic key.

The series of acts 700 can also include receiving an additional key request to store an additional cryptographic key for the payment card account in the hardware security device. The series of acts 700 can further include generating, within the distributed database of the card processing system, an additional metadata layer comprising additional metadata associated with the additional cryptographic key in response to the additional key request.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
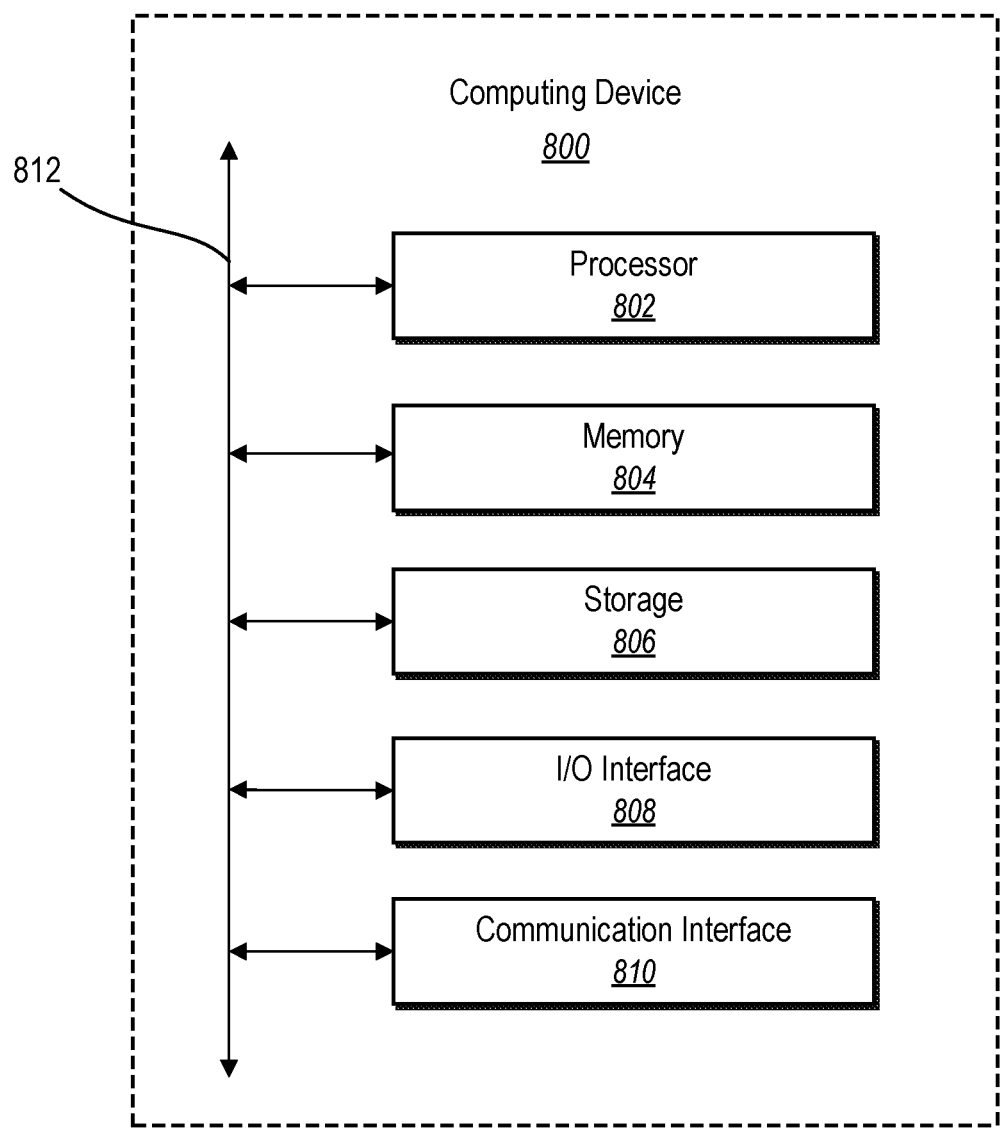
FIG. 8 illustrates a block diagram of an exemplary computing device in accordance with one or more implementations.

FIG. 8 illustrates a block diagram of exemplary computing device 800 that may be configured to perform one or more of the processes described above. One will appreciate that one or more computing devices such as the computing device 800 may implement the system(s) of FIG. 1. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
   receiving, by one or more servers of a card processing system and from a payment card network, a key request to store a cryptographic key for a payment card account in a hardware security device associated with a third-party system;
   generating, by the one or more servers and within a distributed database of the card processing system, a metadata layer comprising metadata associated with the cryptographic key in response to the key request;
   storing, by the distributed database, the metadata layer of the cryptographic key;
   transmitting, by a key exchange system, the cryptographic key to the third-party system for storing in the hardware security device;
   validating, by the one or more servers, the cryptographic key based on the metadata layer comprising the metadata associated with the cryptographic key in response to the payment card network sending a transaction request to the card processing system to perform a transaction comprising the cryptographic key;
   detecting, by the one or more servers utilizing a key monitoring system of the card processing system, one or more events in connection with validating the cryptographic key or based on historical data associated with the payment card account;
   in response to detecting the one or more events, generating a forced exchange message from the key monitoring system to the key exchange system, the forced exchange message comprising instructions to initiate a key exchange operation;
   providing, utilizing the key exchange system, a key exchange request to the payment card network in response to the forced exchange message from the key monitoring system to the key exchange system;
   generating, by the payment card network, a new cryptographic key in response to the key exchange request;
   in response to receiving the new cryptographic key from the payment card network:
      generating, by a key metadata system, a new metadata layer for the new cryptographic key;
      storing, by the distributed database, the new metadata layer;
      invalidating, by the distributed database, the metadata layer associated with the cryptographic key; and
      transmitting, by the key exchange system, the new cryptographic key to the third-party system for storing in the hardware security device and removing the cryptographic key from the hardware security device; and
   performing, by the one or more servers in connection with the hardware security device associated with the third-party system, the transaction corresponding to the transaction request in response to validating the new cryptographic key.

2. The method of claim 1, wherein generating the metadata layer comprises:
   extracting a plurality of attributes of the cryptographic key from the key request; and
   generating, based on the plurality of attributes, the metadata layer comprising a plurality of fields associated with the cryptographic key within the distributed database.

3. The method of claim 2, further comprising generating, within the metadata layer, a field of the plurality of fields comprising a mapping of the cryptographic key to the metadata layer.

4. The method of claim 2, wherein extracting the plurality of attributes of the cryptographic key comprises:
   determining an activation timestamp and an expiration timestamp associated with the cryptographic key;
   determining a version number associated with the cryptographic key; and
   determining a geolocation tag associated with the cryptographic key.

5. The method of claim 2, wherein validating the cryptographic key comprises:
   comparing, utilizing a set of rules, the plurality of attributes of the metadata layer of the cryptographic key with attributes of the transaction request; and
   determining that the transaction request is valid under each rule of the set of rules.

6. The method of claim 5, wherein determining that the transaction request is valid under each rule of the set of rules comprises comparing a version number, one or more timestamps, and a geolocation tag to metadata of the metadata layer associated with the cryptographic key.

7. The method of claim 1, further comprising:
   receiving a request to store a plurality of different versions of the cryptographic key comprising a first version of the cryptographic key for a first transaction type and a second version of the cryptographic key for a second transaction type; and generating, by the one or more servers and within the distributed database of the card processing system, a plurality of metadata layers comprising a first metadata layer comprising metadata associated with the first version of the cryptographic key and a second metadata layer comprising metadata associated with the second version of the cryptographic key.

8. The method of claim 7, further comprising:
validating, by the one or more servers, the first version of the cryptographic key based on the first metadata layer comprising metadata associated with the first version of the cryptographic key in response to an additional transaction request to perform a transaction of the first transaction type; and
in response to validating the first version of the cryptographic key, performing, by the one or more servers in connection with the hardware security device associated with the third-party system, the transaction corresponding to the additional transaction request.

9. The method of claim 1, wherein detecting the one or more events comprise detecting an indication of a failed validation of the cryptographic key according to the metadata of the metadata layer.

10. The method of claim 1, wherein detecting the one or more events comprise detecting an indication of an anomaly associated with the cryptographic key by analyzing historical data associated with the payment card account to detect outliers, changes in events, or drifts in data patterns in connection with the cryptographic key.

11. A card processing system comprising:
one or more non-transitory computer readable media comprising a distributed database; and
at least one processor configured to cause the card processing system to:
receive, from a payment card network, a key request to store a cryptographic key for a payment card account in a hardware security device associated with a third-party system;
generate, within the distributed database of the card processing system, a metadata layer comprising metadata associated with the cryptographic key in response to the key request;
store, by the distributed database, the metadata layer of the cryptographic key;
transmit, by a key exchange system, the cryptographic key to the third-party system for storing in the hardware security device;
validate the cryptographic key based on the metadata layer comprising the metadata associated with the cryptographic key in response to the payment card network sending a transaction request to the card processing system to perform a transaction comprising the cryptographic key;
detect, utilizing a key monitoring system of the card processing system, one or more events in connection with validating the cryptographic key or based on historical data associated with the payment card account;
in response to detecting the one or more events, generate a forced exchange message from the key monitoring system to the key exchange system, the forced exchange message comprising instructions to initiate a key exchange operation;
provide, utilizing the key exchange system, a key exchange request to the payment card network in response to the forced exchange message from the key monitoring system to the key exchange system;
generate, by the payment card network, a new cryptographic key in response to the key exchange request;
in response to receiving the new cryptographic key from the payment card network:
generate, by a key metadata system, a new metadata layer for the new cryptographic key;
store, by the distributed database, the new metadata layer;
invalidate, by the distributed database, the metadata layer associated with the cryptographic key; and
transmit, by the key exchange system, the new cryptographic key to the third-party system for storing in the hardware security device and removing the cryptographic key from the hardware security device; and
perform, in connection with the hardware security device associated with the third-party system, the transaction corresponding to the transaction request in response to validating the new cryptographic key.

12. The card processing system of claim 11, wherein the at least one processor is further configured to cause the card processing system to generate the metadata layer by:
determining, based on the key request, a plurality of attributes of the cryptographic key; and
generating, within the distributed database, the metadata layer comprising the plurality of attributes of the cryptographic key.

13. The card processing system of claim 12, wherein the at least one processor is further configured to cause the card processing system to determine the plurality of attributes of the cryptographic key by determining a version number associated with the cryptographic key, one or more timestamps associated with the cryptographic key, or a geolocation tag associated with the cryptographic key.

14. The card processing system of claim 12, wherein the at least one processor is further configured to cause the card processing system to validate the cryptographic key by:
comparing, utilizing a set of rules, one or more of the plurality of attributes of the metadata layer of the cryptographic key with one or more attributes of the transaction request; and
determining that the transaction request is valid under each rule of the set of rules.

15. The card processing system of claim 11, wherein the at least one processor is further configured to cause the card processing system to:
receive a request to store a plurality of different versions of the cryptographic key comprising a first version of the cryptographic key for a first transaction type and a second version of the cryptographic key for a second transaction type; and
generate, within the distributed database of the card processing system, a plurality of metadata layers comprising a first metadata layer comprising metadata associated with the first version of the cryptographic key and a second metadata layer comprising metadata associated with the second version of the cryptographic key.

16. The card processing system of claim 15, wherein the at least one processor is further configured to cause the card processing system to:
validate the first version of the cryptographic key based on the first metadata layer comprising metadata associated with the first version of the cryptographic key in response to an additional transaction request to perform a transaction of the first transaction type; and in response to validating the first version of the cryptographic key, perform, in connection with the hardware security device associated with the third-party system, the transaction corresponding to the additional transaction request.

17. A non-transitory computer readable medium comprising instructions that, when executed by at least one processor, cause the at least one processor to:
  receive, by a card processing system and from a payment card network, a key request to store a cryptographic key for a payment card account in a hardware security device associated with a third-party system;
  generate, by the card processing system and within a distributed database of the card processing system, a metadata layer comprising metadata associated with the cryptographic key in response to the key request;
  store, by the distributed database, the metadata layer of the cryptographic key;
  transmit, by a key exchange system, the cryptographic key to the third-party system for storing in the hardware security device;
  validate, by the card processing system, the cryptographic key based on the metadata layer comprising the metadata associated with the cryptographic key in response to the payment card network sending a transaction request to the card processing system to perform a transaction comprising the cryptographic key;
  detect, utilizing a key monitoring system of the card processing system, one or more events in connection with validating the cryptographic key or based on historical data associated with the payment card account;
  in response to detecting the one or more events, generate a forced exchange message from the key monitoring system to the key exchange system, the forced exchange message comprising instructions to initiate a key exchange operation;
  provide, utilizing the key exchange system, a key exchange request to the payment card network in response to the forced exchange message from the key monitoring system to the key exchange system;
  generate, by the payment card network, a new cryptographic key in response to the key exchange request;
  in response to receiving the new cryptographic key from the payment card network:
    generate, by a key metadata system, a new metadata layer for the new cryptographic key;
    store, by the distributed database, the new metadata layer;
    invalidate, by the distributed database, the metadata layer associated with the cryptographic key; and
    transmit, by the key exchange system, the new cryptographic key to the third-party system for storing in the hardware security device and removing the cryptographic key from the hardware security device; and
  perform, by the card processing system in connection with the hardware security device associated with the third-party system, the transaction corresponding to the transaction request in response to validating the new cryptographic key.

18. The non-transitory computer readable medium of claim 17, further comprising instructions that, when executed by the at least one processor, cause the at least one processor to generate the metadata layer by:
  extracting a version number associated with the cryptographic key and one or more timestamps associated with the cryptographic key from the key request; and
  generating, within the distributed database, the metadata layer comprising the version number associated with the cryptographic key and the one or more timestamps associated with the cryptographic key.

19. The non-transitory computer readable medium of claim 18, further comprising instructions that, when executed by the at least one processor, cause the at least one processor to validate the cryptographic key by verifying data associated with the cryptographic key in the transaction request according to the version number and the one or more timestamps in the metadata layer.

20. The non-transitory computer readable medium of claim 17, further comprising instructions that, when executed by the at least one processor, cause the at least one processor to:
  receive a request to store a plurality of different versions of the cryptographic key comprising a first version of the cryptographic key for a first transaction type and a second version of the cryptographic key for a second transaction type;
  generate a plurality of metadata layers comprising a first metadata layer comprising metadata associated with the first version of the cryptographic key and a second metadata layer comprising metadata associated with the second version of the cryptographic key; and
  in response to validating the first version of the cryptographic key, perform a transaction corresponding to an additional transaction request to perform a transaction of the first transaction type.

* * * * *